D. H. MEYER.
LOAD LIFTER.
APPLICATION FILED JULY 25, 1912.
1,095,411.
Patented May 5, 1914.
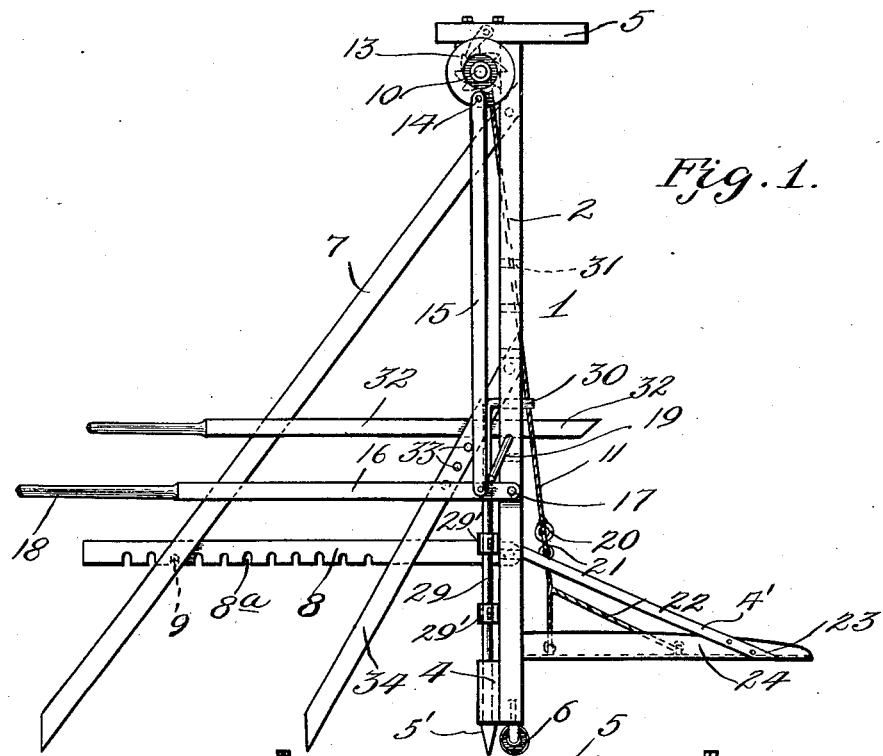
Fig. 1.
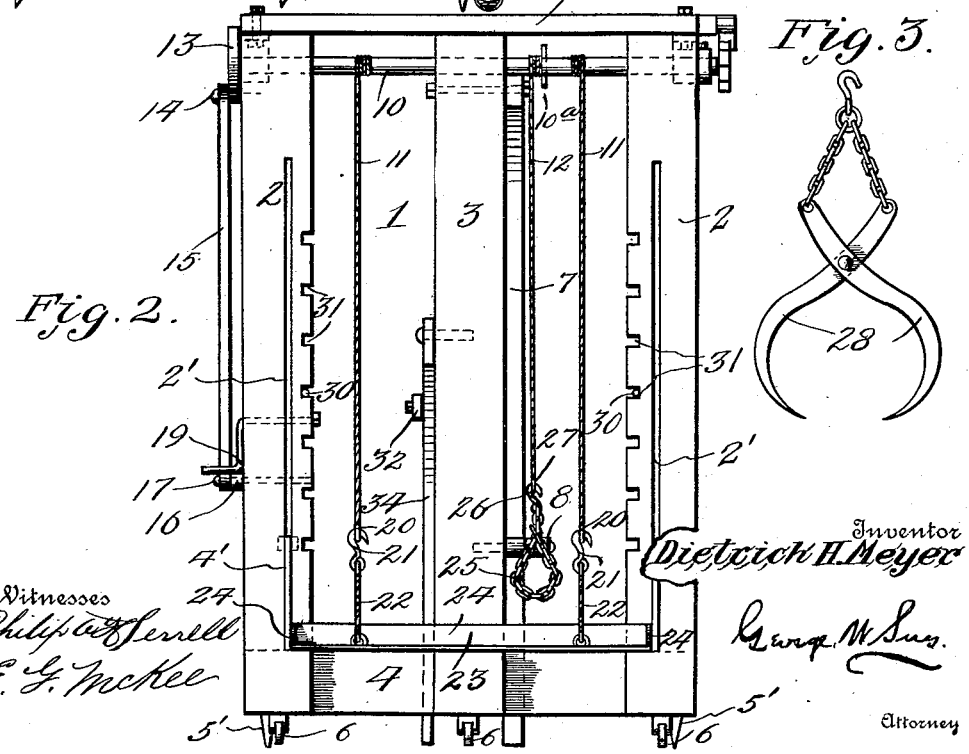
Fig. 2.
Fig. 3.
Witnesses
Philip A. Ferrell
E. F. McKee
Inventor
Dietrich H. Meyer
George W. Suy.
Attorney
COLUMBIA PLANOGRAPH CO., WASHINGTON, D. C.

UNITED STATES PATENT OFFICE.

DIETRICH H. MEYER, OF DOSS, TEXAS.

LOAD-LIFTER.

1,095,411.

Specification of Letters Patent.

Patented May 5, 1914.

Application filed July 25, 1912. Serial No. 711,596.

*To all whom it may concern:*

Be it known that I, DIETRICH H. MEYER, a citizen of the United States, and a resident of Doss, in the county of Gillespie and State of Texas, have invented certain new and useful Improvements in Load-Lifters, reference being had to the accompanying drawings.

This invention relates to improvements in load lifters.

One object of the invention is to provide a device of this character having an improved construction and arrangement of operating mechanism, whereby heavy loads may be readily lifted to the desired elevation with comparatively little effort on the part of the operator.

Another object is to provide a lifting apparatus which will be simple, strong and durable in construction, efficient in operation and which may be readily moved from place to place.

With these and other objects in view, the invention consists of certain novel features of construction, combination and arrangement of parts as will be more fully described and claimed.

In the accompanying drawings: Figure 1, is a side view of my improved load lifter. Fig. 2, is a front view of the same. Fig. 3, is a detail view of a pair of grappling hooks which may be employed in connection with the apparatus.

In the embodiment of the invention, I provide an upright elevator frame 1, comprising vertically disposed side bars 2, a vertically disposed intermediate bar 3, said bars being connected at their lower ends by a lower cross bar 4, and at their upper ends by an upper cross bar 5. On the lower ends of each of the side bars 2 and 3 is secured a caster 6, whereby the frame may be readily rolled from place to place.

Pivotally secured at its upper end to the upper end of the intermediate upright bar 3 is an inclined supporting bar or prop 7, the lower end of which is adapted to engage the ground at a greater or less distance from the upright frame, thereby supporting the latter in an upright position, or at a greater or less inclination as desired. The supporting bar or prop 7 is held in its adjusted positions to support the upright frame 1 by a brace bar 8, having therein a plurality of notches $8^a$, adapted to be engaged with a pin 9, projecting from one side of the bar 7 as shown. The inner end of the brace bar 8 is pivotally connected to the bar 3 of the frame 1.

Revolubly mounted in suitable bearings on the upper end of the frame 1 is a cable winding shaft 10, on which is adapted to be wound the hoisting cables 11, and a load hauling cable 12. The cable 12 and the adjacent cable 11 are separated on the shaft 10 and prevented from being wound on to each other by a cross pin $10^a$, arranged through the shaft as shown. Fixed on one end of the shaft 10 is a crank wheel 13, having thereon an eccentrically disposed wrist pin 14, which is connected by a pitman rod 15, with an operating lever 16. The lever 16 is pivotally connected at its inner end to one of the side bars 1 of the frame as at 17, and has on its outer end a handle 18 whereby the lever is reciprocated. This movement of the lever is imparted to the crank wheel 13 and shaft 10 to wind up the cables 11 and 12 as will be readily understood. The lever 16 is locked or fastened to hold the wheel 13 and shaft 10 against rotation, by a hook or stop member 19, which is pivotally secured in the adjacent side bar 2 of the frame and is adapted to be swung down into engagement with the lever as shown. The lower ends of the cables 11 have secured thereto rings 20, with which are adapted to be engaged hooks 21, secured to short branched cables or flexible connections 22, the ends of which are fastened to a load carrier or lifting device 23, in the form of a flat plate of rectangular shape and having on its side and rear edges upwardly projecting flanges 24. The carrier 23 is suitably engaged at its rear edge with the bars 2 and 3 of the frame 1, and is drawn up the same by the cables 11 when the latter are wound up on the shaft 10 by the lever 16 as hereinbefore described, thereby lifting or hoisting the load on the carrier to the desired elevation.

The cable 12 is provided to draw or haul the load up to the lifter and onto the carrier when the latter is at its lowermost position and in order to attach the outer end of the cable to the load, I provide a load engaging chain or cable 25 with a hook 26, to be engaged with a ring 27, secured to the end of the cable 12. In addition to the load engaging chain 25, I also provide a pair of grappling hooks 28, as shown in Fig. 3 of the drawings and which are adapted to be connected to the end of the cable 12 instead of the chain 25, said hooks being more advantageous for handling some kinds of goods than the chain 25.

In order to support the carrier 23 when raised to the desired elevation and to take the weight of the load off from the hoisting cables, I provide a pair of adjustable carrier supports, comprising vertically disposed rods 29, slidably and pivotally mounted in bearing brackets 29', secured to the rear sides of the bars 2 of the frame 1. The rods 29 have on their upper ends right angularly disposed stop pins 30, which are adapted to be swung into engagement with stop notches 31, series of which are formed in the inner edges of the side bars 2 of the frame as shown. The pins 30 are of sufficient length to project beyond the side of the bars 2, with which the inner edge of the carrier is engaged so that when the latter is lifted to the desired elevation the rods 29 are raised in their bearings and turned to swing the pins 30 into engagement with the next adjacent notch beneath the carrier which may then be lowered until the same rests on the projecting ends of the pins as will be readily understood.

In order to tilt the carrier 23 for the purpose of discharging the load therefrom when raised to the desired elevation, I provide a tilting lever 32, which is adjustably pivoted in one of a series of pivot bolt holes 33, formed in a lever supporting brace 34, secured at its upper end to the bar 3 of the frame 1 and having its outer end engaged with the ground as shown. The inner, shorter end of the lever when thus arranged is adapted to be engaged beneath the inner portion of the carrier so that when the outer or handle end of the lever is depressed the inner end will be raised and engaged with the lower side of the carrier, thereby tilting the latter on the lifting cables and discharging the contents of the carrier into a wagon or receptacle placed to receive the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent is:

1. In a load lifter, an elevator frame, means whereby said frame is supported, a carrier slidably engaged with said frame, a revolubly mounted winding shaft, hoisting cables connected with said carrier and adapted to be wound on said shaft whereby said carrier is raised, a crank wheel fixed on said shaft, an operating lever, a pitman rod connected with said lever and having an eccentric connection with said crank wheel whereby the latter and said shaft are revolved to wind up said cables.

2. In a load lifter, an elevator frame, means whereby said frame is supported, a carrier slidably engaged with said frame a revolubly mounted winding shaft, hoisting cables connected with said carrier and adapted to be wound on said shaft whereby said carrier is raised, a lever operatively connected with said shaft whereby the same is revolved to wind up said cables and thereby lift said carrier, means to lock said lever, and means to support the carrier when lifted to the desired elevation.

3. In a load lifter, an elevator frame, means whereby said frame is supported, a carrier slidably engaged with said frame, a revolubly mounted winding shaft, hoisting cables connected with said carrier and adapted to be wound on said shaft whereby said carrier is raised, a hauling cable adapted to be wound on said shaft, means whereby said cable is connected to a load to draw the same onto said carrier, and a lever operatively connected with said shaft whereby the same is revolved to wind up said hoisting and hauling cables.

4. In a load lifter, an elevator frame, means whereby said frame is supported in an operative position, a load carrier, a cable winding shaft revolubly mounted in said frame, hoisting cables connected to said carrier and adapted to be wound on said shaft whereby the carrier is raised to lift the load thereon, means whereby said shaft is operated, carrier supporting rods adjustably mounted on said frame whereby said carrier may be supported to take the weight thereof and the load thereon off said cables, means whereby said shaft is operated and means whereby the carrier is tilted to discharge the load therefrom.

5. In a load lifter, an elevator frame, a plurality of outer and intermediate, suitably connected upright bars, said outer bars having therein series of notches, supporting rollers secured to the lower end of said frame, a supporting bar pivotally connected to the frame, a brace having an adjustable connection with said bar, a carrier comprising a plate having a sliding engagement with said frame a cable winding shaft revolubly mounted in the latter, hoisting cables connected to said carrier and adapted to be wound on said shaft whereby the carrier is raised, means to operate said shaft, carrier supporting rods slidably mounted on said frame, carrier supporting pins on said rods to engage the notches in said upright bars whereby the carrier may be supported in its raised position, a brace secured at one end of said frame and a tilting lever pivotally and adjustably secured to said brace and adapted to be engaged with the carrier, whereby the latter may be tilted to discharge the load thereon.

In testimony whereof I affix my signature, in presence of two witnesses.

DIETRICH H. MEYER.

Witnesses:
 A. B. BARKER,
 J. P. COOK.

Copies of this patent may be obtained for five cents each, by addressing the "Commissioner of Patents, Washington, D. C."